BEST AVAILABLE COPY

DESIGN.

G. PFEFFER.

DOLL.

APPLICATION FILED OCT. 18, 1920.

Reissued Nov. 30, 1920. 14,998.

WITNESS

G. V. Rasmussen

INVENTOR

GENEVIEVE PFEFFER

BY

Bricen & Schwab

ATTORNEYS

UNITED STATES PATENT OFFICE.

GENEVIEVE PFEFFER, OF SAN JOSE, CALIFORNIA.

DESIGN FOR A DOLL.

14,998. Specification for Reissued Design. Reissued Nov. 30, 1920.

Original No. 51,559, dated December 11, 1917, Serial No. 193,055, filed September 24, 1917, for 3½ years. Application for reissue filed October 16, 1920. Serial No. 417,358. Term of patent 14 years.

*To all whom it may concern:*

Be it known that I, GENEVIEVE PFEFFER, a citizen of the United States, residing at San Jose, in the county of Santa Clara, State of California, have invented a new, original, and ornamental Design for Dolls, of which the following is a specification, reference being had to the accompanying drawing, forming a part thereof.

Figure 1:
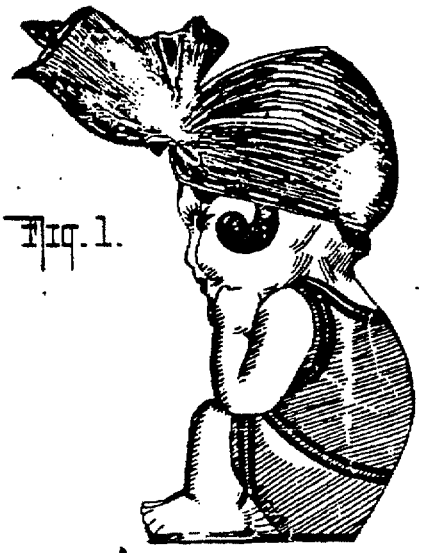

In the drawings Figure 1 is a side elevation of the doll showing my new design.

Figure 2:
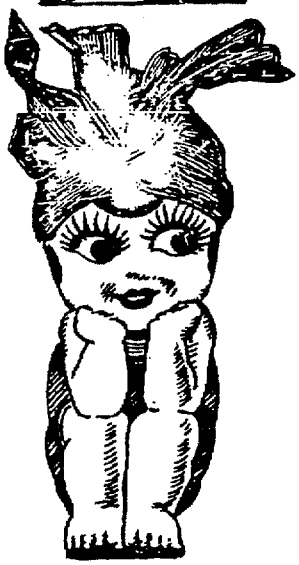

Fig. 2 is a front elevation of the same.

I claim:

The ornamental design for a doll as shown.

GENEVIEVE PFEFFER.